(12) United States Patent
Tsuchiya et al.

(10) Patent No.: US 8,279,548 B2
(45) Date of Patent: Oct. 2, 2012

(54) MICROWAVE OSCILLATING ELEMENT AND THIN FILM MAGNETIC HEAD THEREWITH

(75) Inventors: Yoshihiro Tsuchiya, Tokyo (JP); Kiyoshi Noguchi, Tokyo (JP); Migaku Takahashi, Miyagi (JP); Masakiyo Tsunoda, Miyagi (JP)

(73) Assignee: TDK Corporation, Tokyo (JP)

( * ) Notice: Subject to any disclaimer, the term of this patent is extended or adjusted under 35 U.S.C. 154(b) by 358 days.

(21) Appl. No.: 12/763,577

(22) Filed: Apr. 20, 2010

(65) Prior Publication Data

US 2011/0255197 A1   Oct. 20, 2011

(51) Int. Cl.
   *G11B 5/02*   (2006.01)
(52) U.S. Cl. ............... 360/59; 360/125.31; 360/125.74; 360/324.2
(58) Field of Classification Search .................. 360/59, 360/125.31, 125.74, 324.2
See application file for complete search history.

(56) References Cited

U.S. PATENT DOCUMENTS

| 6,785,092 | B2 | 8/2004 | Covington et al. |
| 7,471,491 | B2 | 12/2008 | Sato et al. |
| 7,961,417 | B2 * | 6/2011 | Seigler et al. ............ 360/59 |
| 2008/0026253 | A1 | 1/2008 | Yuasa et al. |

FOREIGN PATENT DOCUMENTS

| JP | H06-195645 | 7/1994 |
| JP | H10-294504 | 11/1998 |
| JP | A-2007-142746 | 6/2007 |

OTHER PUBLICATIONS

Jian-Gang Zhu et al., "Microwave Assisted Magnetic Recording", IEEE Transactions on Magnetics, vol. 44, No. 1, 2008:125-131 (discussed on pp. 2 and 3 in the specification), Jan. 2008.

Yimin Guo et al., "Micromagnetic Study of Narrow Track Orthogonal Giant Magnetoresistive Heads", J. Appl. Phys., vol. 75, No. 10, 1994:6388-6390, May 1994.

* cited by examiner

*Primary Examiner* — Allen Heinz
(74) *Attorney, Agent, or Firm* — Posz Law Group, PLC

(57) ABSTRACT

A microwave oscillation element of the present invention includes a lamination main part in which an oscillating layer that is a magnetization free layer and that generates a high frequency electromagnetic field by an excitation of a spin wave, a nonmagnetic intermediate layer, a polarizer layer, and a reference layer that is to be a base magnetic layer of a spin transfer due to application of current are layered in this order. The oscillating layer is made of CoIr, the polarizer layer is configured of CoCr or CoRu; and the nonmagnetic intermediate layer is configured of Cr or Ru. As a result, the efficiency of the spin injection is improved and the microwave oscillation element where the oscillation efficiency is excellent can be realized.

18 Claims, 5 Drawing Sheets

FIG.1
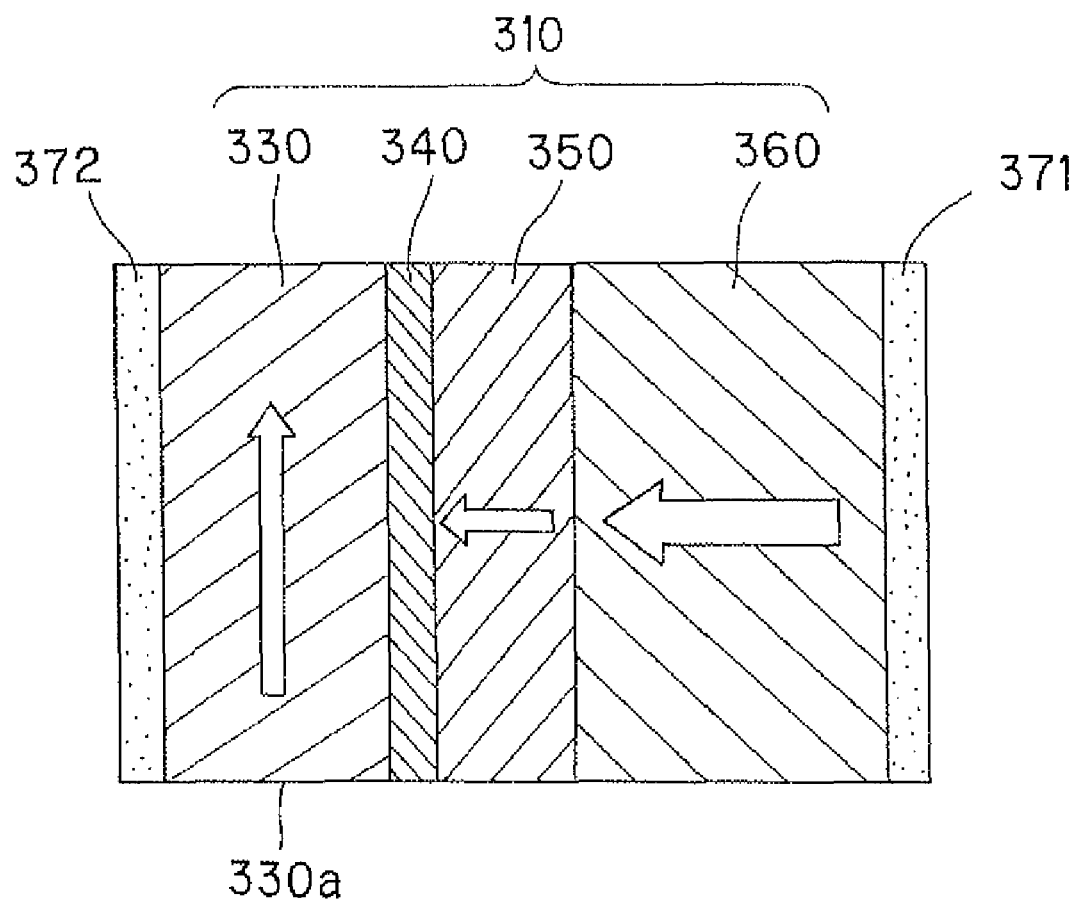
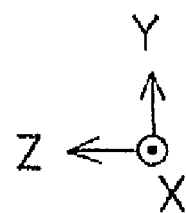

MICROWAVE OSCILLATING ELEMENT AND THIN FILM MAGNETIC HEAD THEREWITH

BACKGROUND OF THE INVENTION

1. Field of the Invention

The present invention relates to a microwave oscillation element (or microwave oscillator). Particularly, the present invention relates to a microwave oscillation element that is used for irradiating a microwave to a magnetic recording medium and writing data on an irradiated part, and relates to a thin film magnetic head using the same. Additionally, it is possible for the microwave oscillation element of the present invention to be applied to various types of high-frequency devices.

2. Description of Related Art

Regarding to high density of magnetic recording devices, and specifically hard disks incorporated therein as recording mediums, there is a demand for improvement in the performance of thin film magnetic heads.

In the thin film magnetic heads, a composite type thin film magnetic head is widely used. The composite type thin film magnetic head has a structure where a reproducing head having a magneto-resistive effect element (MR element) for reading and a recording head having an induction-type electromagnetic conversion element for writing are layered.

In magnetic recording, a recording medium (a hard disk) that is a recording object, is configured with discontinuous mediums of magnetic microparticles, and each magnetic microparticle has a single magnetic domain structure. In the magnetic recording, recording is executed with a plurality of the microparticles.

In order to increase recording density, asperities on boundaries in recording regions must be decreased. Therefore, the magnetic microparticles must be made small; however, this causes in a problem that heat stability deteriorates due to a decrease in the volume of the microparticle.

$K_u V/K_B T$ gives an indication of the heat stability. Herein, $K_u$ indicates anisotropic energy of the magnetic microparticle, V indicates a volume of one magnetic microparticle, $K_B$ indicates the Boltzmann constant, and T indicates an absolute temperature. Making the magnetic microparticle smaller means making V small, and this results in decreasing a value of $K_u V/K_B T$. Consequently, a measurement to be considered is to increase $K_u$. However, if $K_u$ is increased, coercivity is increased. On the other hand, a writing strength of a magnetic head (the size of a magnetic field made by a magnetic head during recording) is determined by a saturation magnetic flux density of a soft magnetic material of a core. For that, when the coercivity of the recording medium increases over a tolerance value determined by a limitation of the writing magnetic field strength, it is impossible to write information.

As a first method to solve such a problem, use of a patterned medium is considered. In ordinary magnetic recording, plural magnetic microparticles N are used to record one bit. When one bit is recorded in one region having a volume of NV, heat stability is obtained by $K_u VN/K_B T$ and is drastically improved.

As a second method to solve the problem of the heat stability, another method is proposed. Even though the method requires the use of a magnetic material having a large amount of $K_u$, in this method, recording is executed under the situation where the coercivity of the recording medium is decreased due to the application of heat just before the application of a writing magnetic field. This is referred as a heat assisted magnetic recording. This art is similar to light magnetic recording. However, the difference is that, while light has a space resolution in the light magnetic recording, a magnetic field has a space resolution in the heat assisted magnetic recording.

However, both of the first and second methods described above require significantly changes to a conventional magnetic head structure and a recording medium structure, resulting in large difficulties in technology and cost.

Under such a situation, Jimmy Zhu from Carnegie Mellon University has proposed a microwave assisted recording (document 1: IEEE TRANSACTIONS ON MAGNETICS Vol. 44, No. 1, January 2008, pp. 125-131) as a third method.

This method is realized when, in a conventional structure of a writer head, an MR element such as a TMR or CPP-GMR element is inserted between a main magnetic pole and a trailing shield thereof. It can be said that realizing this structure is much easier than manufacturing the patterned medium and the heat assisted recording head, and recently this has received much attention.

Also, in document 2: WO 2003/010758 (WO 2003/010758, JP National Publication No. 2005-525663) and document 3: JP Laid-Open Publication No. 2005-285242, similar microwave assisted magnetic recordings is disclosed.

In the microwave assisted magnetic recording proposed therein, a spin wave excitation element is used. The spin wave excitation element is configured with a magnetization free layer, a nonmagnetic layer, a magnetization pinned layer and a pair of electrodes. The magnetization free layer in which a magnetization direction changes according to an external magnetic field and the magnetization fluctuates, is formed in the vicinity of a recording magnetic pole. The nonmagnetic layer is layered on the magnetization free layer. The magnetization pinned layer is layered on the nonmagnetic layer, and the magnetization of the magnetization pinned layer is pinned. The pair of electrodes is formed at both edge parts in a lamination direction of a multilayer. When, in the spin wave excitation element, current is applied in a direction perpendicular to a surface of each layer of the multilayer, this applied current transfers an electron spin. Due to the transfer of the spin, a spin torque is generated, and due to the spin torque, a spin precession is excited on the magnetization free layer. In other words, due to spin polarized current injected from the magnetization pinned layer to the magnetization free layer by current flowing, the spin precession is excited on the magnetization free layer.

From the magnetization free layer in which the spin wave is excited, a high-frequency electromagnetic field in the microwave region leaks and the magnetization of the magnetic recording layer of the magnetic recording medium receiving the electromagnetic field fluctuates. As a result, magnetization inversion of the magnetic recording layer, which used to be impossible to achieve only with a writing magnetic field from the main magnetic pole, becomes possible.

In this case, a frequency of the high-frequency electromagnetic field, i.e., a frequency of the precession of magnetization of the magnetization free layer should be tuned to an inherent magnetic resonant frequency of the magnetic recording layer. In order to achieve this, it is required to adjust a thickness of the magnetization free layer, a magnetic field (a bias magnetic field) applied to the magnetization free layer, a spin polarized current amount (current amount for exciting the spin wave) injected to the magnetization free layer and the like.

In document 1 (IEEE TRANSACTIONS ON MAGNETICS Vol. 44, No. 1, January 2008, pp. 125-131), which is described above, art is disclosed. In the art, adjusting an amount of a perpendicular magnetic anisotropy of a magnetic layer, the magnetic layer named as "Layer with perpendicular anisotropy" and contacting the magnetization free layer, is relevant to effectively be given the bias magnetic field, and the frequency of the precession can be adjusted.

However, with only the contents of the art disclosed in documents 1 through 3 described above, it can be said that it is difficult to obtain stable oscillation even at high frequency. Moreover, it can be said that an improvement in an oscillation efficiency is not particularly expected.

On the other hand, in document 4: K. Yoshida, SRC (Head) digest (2008), it is reported that, when a CoIr alloy that is a material having negative $K_u$ is used for a free layer as an oscillator, the stable oscillation is obtained even at high frequency. However, in document 4, a detailed description regarding a spacer layer and a material of an interface are not given, and it can be said that it is not clarified whether or not a spin injection having high efficiency is substantially executed. Additionally, it is known that a CoIr alloy is a material indicating negative AMR (document 4: T. R. McGuire et. al., IEEE TRANS. ON MAG., VOL. MAG-20, NO. 5, SEPTEMBER 1984). Therefore, it can be said that CoIr is a material indicating minority spin conduction (spin asymmetry coefficient β is negative).

Under the current situation where such a conventional art is disclosed, an inventor of the present application conducted an additional experiment of a combined element configuration, i.e., an experiment where a TMR/CPP-GMR element was used as the microwave oscillation element. In the TMR/CPP-GMR element, a CoIr layer that is a material where Ku is negative and the spin asymmetry coefficient β is negative, is applied to the magnetization free layer of the spin wave excitation element (microwave oscillation element) that is likely disclosed in the conventional art. As a result of this, contrary to the expectation of the inventor of the present application, the spin injection efficiency was low.

The present invention was invented in such a current situation. The object is to improve the efficiency of the spin injection and to provide a microwave oscillation element having extremely excellent oscillation efficiency.

SUMMARY OF THE INVENTION

In order to resolve the above object, a microwave oscillation element of the present invention includes a lamination main part in which an oscillating layer that is a magnetization free layer and that generates a high frequency electromagnetic field by an excitation of a spin wave, a nonmagnetic intermediate layer, a polarizer layer, and a reference layer that is to be a base magnetic layer of a spin transfer due to application of current are layered in this order, wherein the oscillating layer is made of CoIr; the polarizer layer is configured of CoCr or CoRu; and the nonmagnetic intermediate layer is configured of Cr or Ru.

In the preferred embodiment of the microwave oscillation element of the present invention, the polarizer layer and the reference layer are respectively magnetized in a perpendicular direction to an in-plane; and the oscillating layer has an easy magnetization axis in a horizontal direction to an in-plane.

In the preferred embodiment of the microwave oscillation element of the present invention, each layer of the lamination main parts in which the oscillating layer, the nonmagnetic intermediate layer, the polarizer layer, and the reference layer are layered in this order, is configured of a material having a hexagonal system.

In the preferred embodiment of the microwave oscillation element of the present invention, the oscillating layer is made of CoIr; the nonmagnetic intermediate layer is made of Ru; the polarizer layer is made of CoCr; and the reference layer is made of CoPt.

In the preferred embodiment of the microwave oscillation element of the present invention, the oscillating layer is made of CoIr; the nonmagnetic intermediate layer is made of Cr; the polarizer layer is made of CoCr; and the reference layer is made of CoPt.

In the preferred embodiment of the microwave oscillation element of the present invention, the oscillating layer is made of CoIr; the nonmagnetic intermediate layer is made of Ru; the polarizer layer is made of CoRu; and the reference layer is made of CoPt.

In the preferred embodiment of the microwave oscillation element of the present invention, the oscillating layer is made of CoIr; the nonmagnetic intermediate layer is made of Cr; the polarizer layer is made of CoRu; and the reference layer is made of CoPt.

In the preferred embodiment of the microwave oscillation element of the present invention, the reference layer is configured with CoPt, FePt, a multilayer film of Co/Pd or a multilayer film of Co/Pt.

In the preferred embodiment of the microwave oscillation element of the present invention, a Cr content of CoCr that configures the polarizer layer is 5-15 at %.

In the preferred embodiment of the microwave oscillation element of the present invention, a Ru content of CoRu that configures the polarizer layer is 4-11 at %.

In the preferred embodiment of the microwave oscillation element of the present invention, an Ir content of the oscillating layer made of the CoIr is 2-26 at %.

In the preferred embodiment of the microwave oscillation element of the present invention, electrodes are formed at both edge parts in a lamination direction of the lamination main part; due to applying current for a spin wave excitation from a side of the reference layer to a side of the oscillating layer, magnetization information of the reference layer is transferred to the oscillating layer through the nonmagnetic intermediate layer; an excitation of a spin wave occurs; and a high frequency electromagnetic field is generated from the oscillating layer.

A thin film magnetic head of the present invention includes a first magnetic pole and a second magnetic pole for generating a writing magnetic field for writing on a magnetic recording medium; and the microwave oscillation element described above provided at a position that is between the first magnetic pole and the second magnetic pole, and that is on a medium opposing surface.

In the preferred embodiment of the thin film magnetic head of the present invention, the oscillating layer that configures the microwave oscillation element is adjacent to the first magnetic pole; the reference layer that configures the microwave oscillation element is adjacent to the second magnetic pole; the thin film magnetic head has a structure in which current for the spin wave excitation can be applied from the second magnetic pole to the first magnetic pole; due to application of the current, magnetization information on a side of the reference layer is transferred to the oscillating layer through the nonmagnetic intermediate layer; an excitation of the spin wave occurs; and a high frequency electromagnetic field is generated from the oscillating layer.

In the preferred embodiment of the thin film magnetic head of the present invention, a width in a track width direction at an edge of a medium opposing surface side of a microwave oscillation element is narrower than a width in a track width direction at a edge of a medium opposing surface side of the first magnetic pole for generating the writing magnetic field.

In the preferred embodiment of the thin film magnetic head of the present invention, a frequency of a high frequency electromagnetic field generated from the oscillating layer that configures the microwave oscillation element is substantially equal to a magnetic resonant frequency of the magnetic recording layer of the magnetic recording medium that is a writing object.

A head gimbal assembly of the present invention includes a slider including the thin film magnetic head described above and positioned so as to oppose a recording medium; and a suspension elastically supporting the slider.

A magnetic disk device of the present invention includes a slider including the thin film magnetic head described above and positioned so as to oppose a recording medium; and a positioning device that support the slider and position with respect to the recording medium.

BRIEF DESCRIPTION OF THE DRAWINGS

FIG. 1 is a cross sectional view illustrating a lamination structure of a microwave oscillation element of the present invention.

DETAILED DESCRIPTION OF THE INVENTION

Figure 2:
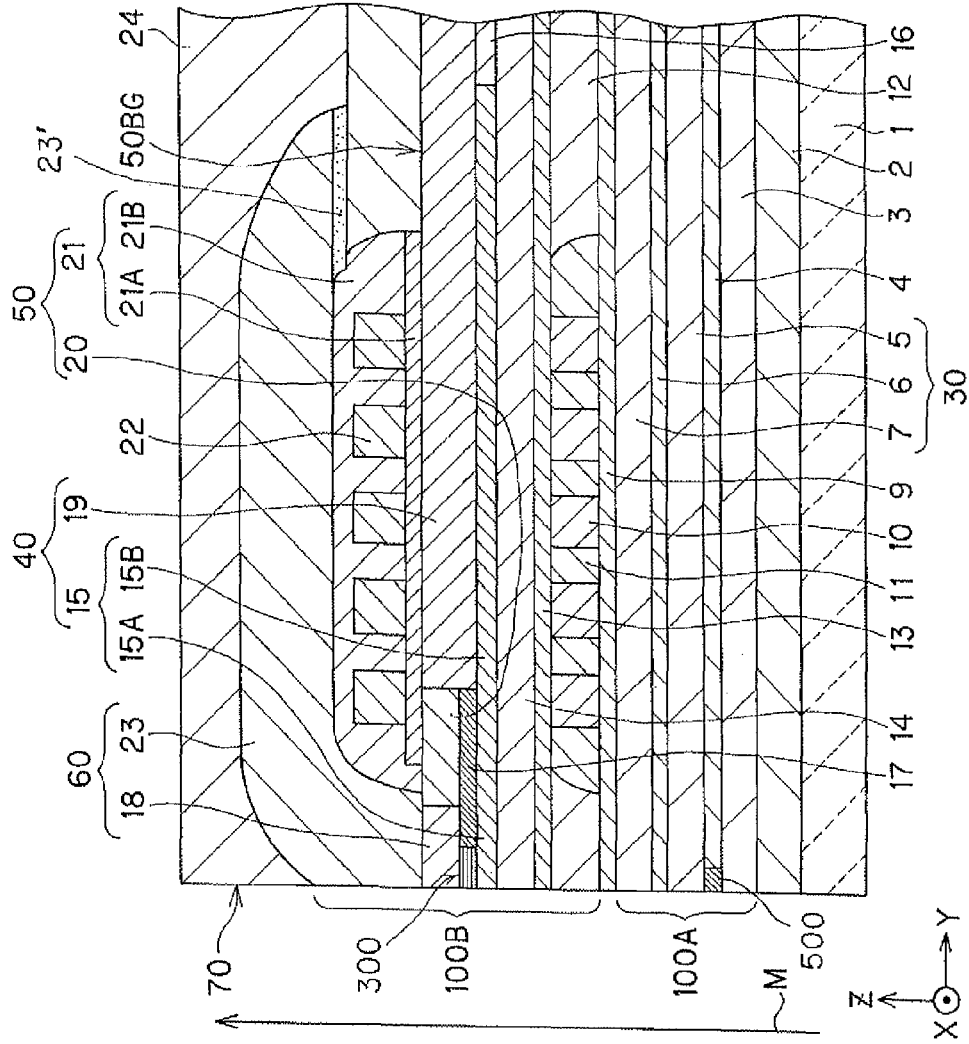
FIG. 2A is a main part cross sectional view of a thin film magnetic head parallel to a so-called air bearing surface (ABS).
FIG. 2B is a cross sectional view of the thin film magnetic head orthogonal to the ABS.

Initially, a detailed explanation will be given regarding a configuration of a microwave oscillation element of the present invention.

[Configuration of a Microwave Oscillation Element]

FIG. 1 is a cross sectional view illustrating a preferred example of a microwave oscillation element 300 of the present invention. Z-direction of the view indicates a lamination direction of each layer. It can be layered from either side of a minus direction or a plus direction of the z-direction of the view.

The microwave oscillation element 300 of the present invention is configured having a lamination main part 310 in which a oscillating layer 330, a nonmagnetic intermediate layer 340, a polarizer layer 350 and a reference layer 360 are layered in this order.

Particularly, the polarizer layer 350 inserted between the nonmagnetic intermediate layer 340 and the reference layer 360 is one of the unique characteristics in the present invention.

Ordinarily, electrodes 371 and 372 are formed at both edge parts in the lamination direction of the lamination main part 310. This makes it possible to apply current in the lamination direction of the lamination main part 310.

The oscillating layer 330 is configured of a material having negative spin asymmetry coefficient β, and preferably is made of CoIr.

Ir content of the oscillating layer made of CoIr is 2-26 at %, preferably 17-23 at %. When the Ir content is less than 2 at % or over 26 at %, the spin asymmetry coefficient β changes from negative to positive. As a result, an improvement in the efficiency of a spin injection is not observed, and a disadvantage that an oscillation efficiency is not improved tends to occur.

Herein, the spin asymmetry coefficient β (β: the spin asymmetry for bulk scattering) is commonly expressed in the following expression.

$$\beta = (\rho\downarrow - \rho\uparrow)/(\rho\downarrow + \rho\uparrow)$$

β in the above described expression is an indicator for expressing a flowability of up-spin and down-spin.

The up-spin indicates an electron that rotates right-handed, and the down-spin indicates an electron that rotates in left-handed direction.

The down-spin (minority-spin) means a minority electron, and $\rho\downarrow$ in the above-described expression means a bulk resistivity of the down-spin (minority-spin).

The up-spin (majority-spin) means a majority electron, and $\rho\uparrow$ in the above-described expression means a bulk resistivity of the up-spin (majority-spin).

For example, when $\rho\downarrow=0$, the bulk resistivity of the down-spin is 0, and only a down-spin electron flows. In this case, β value in the above-described expression is expressed as β=−1.

On the other hand, for example, when $\rho\uparrow=0$, the bulk resistivity of the up-spin is 0, and only an up-spin electron flows. In this case, β value in the above-described expression is expressed as β=+1.

A material whose spin asymmetry coefficient is less than 0 (β<0) exhibits a so-called minority spin conduction, and has characteristics that a resistance becomes small when the two magnetization directions are anti-parallel, and on the other hand, the resistance becomes large when the two magnetization directions are parallel. Ordinarily, a material having a negative AMR ratio has β<0.

Similarly, the polarizer layer 350 is configured of a material of which the spin asymmetry coefficient β is negative, and preferably is made of CoCr or CoRu.

When the polarizer layer is made of CoCr, Cr content is 2-30 at % and preferably 5-15 at %. When the Cr content is less than 2 at % or over 30 at %, the spin asymmetry coefficient β changes from negative to positive. Accordingly, an efficiency of a spin injection is not improved, and a disadvantage that the oscillation efficiency is not improved tends to occur.

When the polarizer layer is configured of CoRu, Ru content is 2-35 at % and preferably 4-14 at %. The Ru content is preferred to be small, or around approximately 7.5 at %. When the Ru content is less than 2 at % or over 35 at %, the spin asymmetry coefficient β is not negative. The efficiency of the spin injection is not improved, and the disadvantage that the oscillation efficiency is not improved tends to occur.

A material of the nonmagnetic intermediate layer 340 is chosen so as to emerge predefined characteristics, considering materials of the polarizer layer 350 and the oscillating layer 330 that sandwich the nonmagnetic intermediate layer 340.

The material of the nonmagnetic intermediate layer 340 is chosen from materials whose γ value (a spin asymmetry coefficient of interface scattering) at an interface between the nonmagnetic intermediate layer 340 and the oscillating layer 330, and whose γ value (a spin asymmetry coefficient of interface scattering) at an interface between the nonmagnetic intermediate layer 340 and the polarizer layer 350 are both negative (each γ value<0). A preferable specific material of the nonmagnetic intermediate layer 340 as described above is Cr or Ru.

Herein, the spin asymmetry coefficient of the interface scattering γ (γ: the spin asymmetry coefficient of the interface scattering) is generally expressed in the following expression.

$$\gamma = (r\downarrow - r\uparrow)/(r\downarrow + r\uparrow)$$

The γ of the above-described expression indicates the flowability of the up-spin and the down-spin at the interface between the nonmagnetic intermediate layer 340 and the oscillating layer 330, and the interface between the nonmagnetic intermediate layer 340 and the polarizer layer 350.

The up-spin indicates an electron that rotates in a right-handed direction, and the down-spin indicates an electron that rotates in a left-handed direction.

The down-spin (minority-spin) means a minority electron, and $r\downarrow$ of the above-described expression indicates an interfacial resistance ratio of the down-spin (minority-spin).

On the other hand, the up-spin (majority-spin) means a majority electron, and $r\uparrow$ of the above-described expression indicates an interfacial resistance ratio of the up-spin (majority-spin).

For example, when $r\downarrow=0$, the interfacial resistance of the down-spin is 0, and then only a down-spin electron flows. In this case, a γ value of the above-described expression is expressed as γ=−1.

On the other hand, for example, when $r\uparrow=0$, the interfacial resistance of the up-spin is 0, and only an up-spin electron flows. In this case, a γ value in the above-described expression is expressed as γ=+1.

For example, when Cr is chosen as a material of the nonmagnetic intermediate layer 340, a γ value at the Co/Cr interface is expressed as γ≈−0.24. When Ru is chosen as a material of the nonmagnetic intermediate layer 340, a γ value at a Co/Ru interface is expressed as γ≈−0.2.

Namely, it is noted regarding the invention that the oscillating layer 330 and the polarizer layer 350 are configured of materials satisfying the spin asymmetry coefficient β<0. Also, with respect to a selection of a material of the nonmagnetic intermediate layer 340 that intervenes between the oscillating layer 330 and the polarizer layer 350, materials satisfying γ<0 are required. Herein, the γ value (the spin asymmetry coefficient of the interface scattering) is determined at both interfaces with the nonmagnetic intermediate layer 340.

Without a fundamental design concept to be a major premise, it does not provide effects that an efficiency of the spin injection of the present invention is improved and the oscillation efficiency becomes extremely high.

The reference layer 360 is configured with, for example, CoPt, FePt, a multilayer film of Co/Pd, or a multilayer film of Co/Pt or the like.

Spin magnetization information of the reference layer 360 is basic information that is transferred to the oscillating layer through the nonmagnetic intermediate layer 340 due to current application and that generates excitation of a spin wave.

It is desired that each layer of a lamination main part 310 where the oscillating layer 330, the nonmagnetic intermediate layer 340, the polarizer layer 350 and the reference layer 360, which are described above, are layered in this order, is configured of hexagonal materials. For example, the oscillating layer 330 should be configured of CoIr, the nonmagnetic intermediate layer 340 should be configured of Ru, the polarizer layer 350 should be configured of CoCr, and the reference layer 360 should be configured of CoPt.

Specifically, a configuration of the lamination main part 310 made of $Co_{80}Ir_{20}/Ru/Co_{92.5}Cr_{7.5}/Co_{80}Pt_{20}$ is one preferable example. All of these are hexagonal materials having almost the same distance between crystal lattices and having an advantage of a crystal orientation when laminated.

Cr itself is not a hexagonal material. However, the distance between lattices on a (110) surface of Cr is excellent in the configuration of the above-described lamination main part 310. It can be said that the configuration of the lamination main part 310 made of $Co_{80}Ir_{20}/Cr/Co_{92.5}Cr_{7.5}/Co_{80}Pt_{20}$ is one preferable example.

When configuring the above-described microwave oscillation element, as illustrated in FIG. 1, it is desired that the polarizer layer 350 and the reference layer 360 are magnetized in a perpendicular direction (z-direction) in the plane respectively and the oscillating layer 330 has an easy magnetization axis in a horizontal direction to an in-plane.

Ordinarily, as described above, the electrodes 371 and 372 are formed at both edge parts of the lamination direction of the lamination main part 310. Due to the application of current for spin wave excitation from a side of the reference layer 360 to a side of the oscillating layer 330, magnetization information of the reference layer 360 is transferred to the oscillating layer 330 through the nonmagnetic intermediate layer 340, the excitation of the spin wave occurs, and the high-frequency electromagnetic field is generated from the oscillating layer 330. An emerging area of the high frequency electromagnetic field is a lateral face direction of the oscillating layer 330 (a lateral face 330a, which is perpendicular to the lamination direction (z-direction) of the lamination main part 310).

Additionally, each layer configuring the lamination main part 310 is arbitrarily designed in relation to the desired size of the microwave oscillation element. However, ordinarily, a layer thickness of the oscillating layer 330 is approximately 3-20 nm (preferably 5-10 nm), a layer thickness of the polarizer layer 350 is approximately 0.5-10 nm (preferably 1-5 nm), a layer thickness of the nonmagnetic intermediate layer 340 is approximately 2-10 nm (preferably 2-5 nm), and a thickness of the reference layer 360 is approximately 3-20 nm (preferably 5-10 nm).

An oscillation frequency of the oscillating layer 330 of the microwave oscillation element of the present invention is approximately 1-20 GHz. The frequency of the oscillating layer 330 due to a precession can be arbitrarily set by setting, for example, the layer thickness of the oscillating layer 330, a magnetization intensity of the reference layer 360, and a parameter of an amount of current for exciting the spin wave, or the like.

[Applied Configuration of the Microwave Oscillation Element]

The above-described microwave oscillation element can be incorporated in a recording core gap of the thin film magnetic head and used, and/or can be applied to any kind of high-frequency devices and used.

Hereafter, an explanation will be given with one preferable example of a configuration of a thin film magnetic head. In the configuration of the thin film magnetic head, the above-described microwave oscillation element is incorporated in the reading core gap of the thin film magnetic head, and this makes it possible to reverse a magnetization of the magnetic recording layer, which previously was impossible with only a writing magnetic field from the main magnetic pole.

(Explanation Regarding a Total Structure of the Thin Film Magnetic Head)

An explanation will be given regarding a total structure of a preferred example of the thin film magnetic head of the present invention referring to FIGS. 2A, 2B, and 3.

In the explanation described below, "width" means a size in the x-direction, "length" means a size in the y-direction, and "thickness" means a size in the z-direction, respectively. The x-direction, the y-direction, and the z-direction are illustrated in the drawings. In the y-direction, a side that is close to the ABS (a surface of the thin film magnetic head opposite to the recording medium) is referred to as "forward," and the opposite side (a back area side) is referred to as "rearward." A direction in which lamination films are layered is referred to as "upward" or "upper side," and the opposite direction is referred to as "downward" or "lower side."

The special characteristics of the present invention is that the above-described microwave oscillation element 300 (especially, when the two magnetic poles that sandwich and hold the microwave oscillation element 300 are used as a substitute for electrodes, only with the lamination part 310 of the microwave oscillation element 300 required) is positioned between a first magnetic pole (a tip part 15A of a main magnetic pole 15, which will be described later) that generates a writing magnetic field for writing on the magnetic recording medium and a second magnetic pole (a throat height (TH) defining layer 18 that is positioned at a tip part of the write shield layer 60, which will be described later.), being on to a medium opposing surface.

FIG. 2A illustrates a cross sectional view of the thin film magnetic head that is parallel to the so-called ABS. FIG. 2B illustrates a cross sectional view of the thin film magnetic head that is orthogonal to the ABS. The ABS corresponds to a surface where the thin film magnetic head is opposed to the magnetic recording medium. FIG. 3 illustrates an enlarged plan view in the vicinity of the magnetic pole layer for executing a perpendicular magnetic recording.

The thin film magnetic head illustrated in FIGS. 2A and 2B is used in a mounted manner on the magnetic recording device, such as, for example, a hard disk drive to execute a magnetic treatment to the magnetic recording medium such as, for example, a hard disk that moves in a medium traveling direction.

The thin film magnetic head illustrated in FIGS. 2A and 2B as an example is a so-called composite type head that executes both a recording process and a reproducing process as a magnetic process. As illustrated in FIGS. 2A and 2B, the structure has a configuration where an insulating layer 2, a reproducing head part 100A, a separation layer 9, a shield type recording head part 100B and an overcoat layer 24 are layered on a substrate 1 in this order. The substrate 1 is configured of a ceramic material such as ALTIC ($Al_2O_3$.TiC). The insulating layer 2 is configured of a nonmagnetic insulating material such as aluminum oxide ($Al_2O_3$; hereafter indicated as "alumina"). The reproducing head part 100A executes a reproducing process of magnetic information, which is recorded by a magneto-resistive (MR) effect. The separation layer 9 is configured of a nonmagnetic insulating material such as, for example, alumina. The shield type recording head part 100B executes a recording process of a perpendicular recording system. The overcoat layer 24 is configured of a nonmagnetic insulating material such as, for example, alumina.

In the example illustrated in the drawings, a reproducing head part 100A has a lamination structure where a lower part lead shield layer 3, a magnetoresistive effect (MR) element 500, and a shield layer 5 (a part of an upper part lead shield layer 30 in the example) are layered in this order. A shield gap film 4 is formed at a rear edge surface of the MR element 500. Preferred examples of the MR element 500 are a tunneling magnetoresistance (TMR) element, a current-perpendicular-to-plane-giant magnetoresistive (CPP-GMR) element, and the like.

Both the lower lead shield layer 3 and the upper lead shield layer 30 magnetically separate the MR element from the vicinity, and are formed in a manner of extending rearwardly from the ABS 70.

In the present embodiment, the upper lead shield layer 30 is divided into two shield layers 5 and 7 sandwiching a nonmagnetic layer 6 in a thickness direction. Namely, the upper lead shield layer 30 has a structure where the upper first lead shield layer 5, the nonmagnetic layer 6, and the upper second shield layer 7 are layered in this order from a side of the vicinity of a shield gap film 4.

The upper first lead shield layer 5 is configured of a magnetic material such as, for example, Permalloy or the like. The upper second lead shield layer 7 is also configured of a magnetic material such as, for example, Permalloy or the like. The nonmagnetic layer 6 is configured of a nonmagnetic material such as, for example, ruthenium (Ru), alumina, or the like.

It is not necessary for the upper lead shield layer 30 to have the lamination structure as the present embodiment, and the upper lead shield layer 30 can also have the same single layer structure as the lower lead shield layer 3, which is configured only with the lower lead shield layer 3.

The shield gap film 4 is configured of a nonmagnetic material such as, for example, alumina or the like.

The recording head part 100B has a lamination structure where, for example, thin film coil 10, a nonmagnetic layer 14, a main magnetic pole layer 40, a gap layer 17, thin film coil 22, and the write shield layer 60 are layered in this order. The periphery of the thin film coil 10 is filled with the insulating layers 11, 12 and 13, and the thin film coil 10 is formed as a first level. The periphery of the main magnetic pole layer 40 is partially filled with the insulating layer 16. The thin film coil 22 is filled with an insulating layer 50 that configures an opening part of magnetic connection (a back gap 50BG), and that is formed as a second level.

Figure 3:
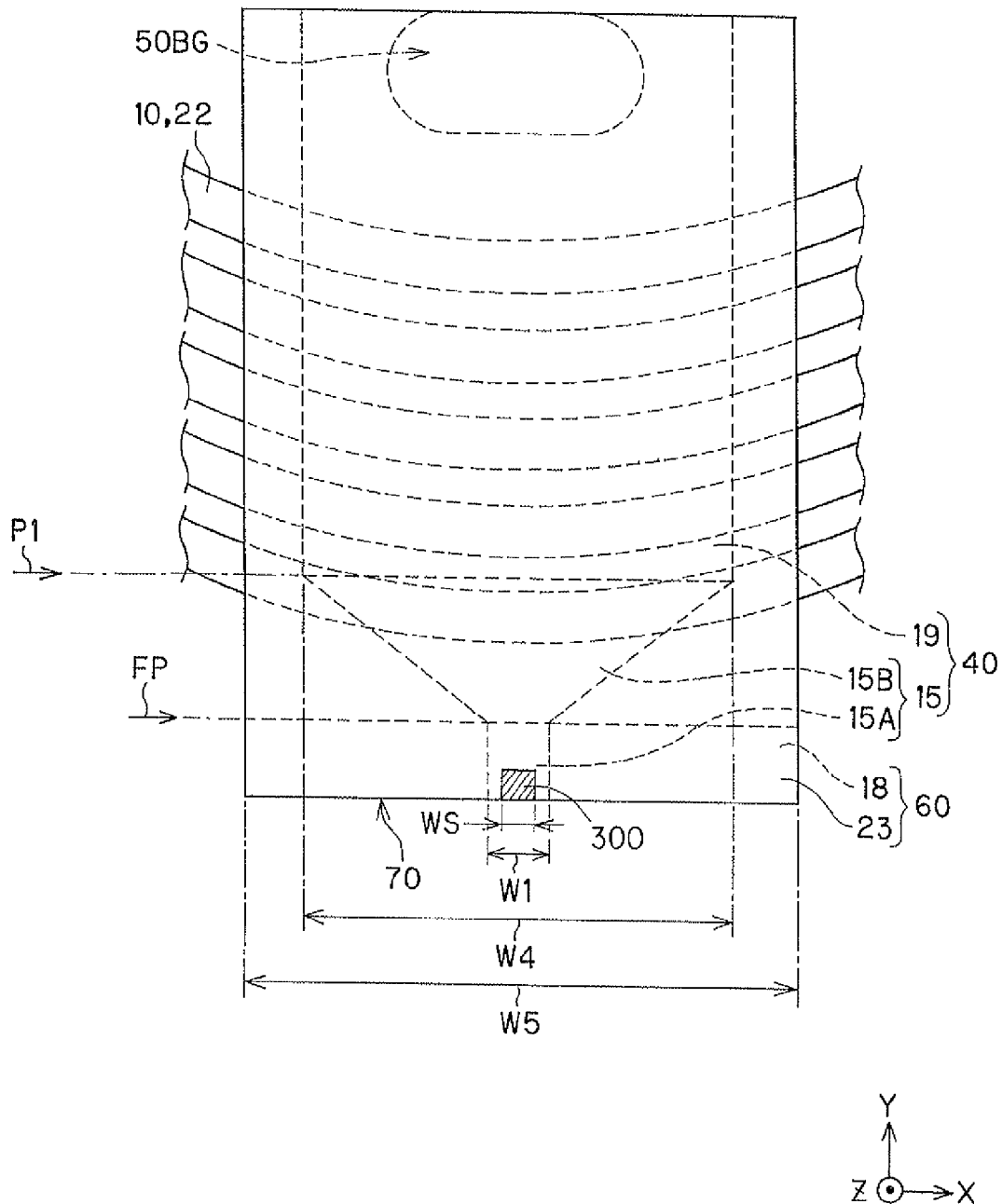
FIG. 3 is an enlarged plan view of the vicinity of a magnetic pole layer that performs perpendicular magnetic recording.

FIG. 3 selectively illustrates a main part (the thin film coils 10 and 22, the main magnetic pole layer 40, and the write shield layer 60) from the recording head part 100B.

The thin film coil 10 mainly generates a magnetic flux for to suppress a leak of the magnetic flux for recording that is generated in the thin film coil 22. The thin film coil 10 is also referred to as a bucking coil.

Such thin film coil 10 has a spiral structure, and, for example, are operated such that current flows in an opposite direction to the direction where current flows in the thin film coil 22.

A number of tunes of the thin film coil 10 is preferred to correspond to a number of tunes of the thin film coil 22, and the preferred range is, for example, 2-7 turns. A helical coil can be also used.

The insulating layers 11, 12, and 13 are formed such that the thin film coil 10 is electrically separated from the periphery. The insulating layer 11 is formed so as to fill each of intervals formed by winding coils space of the thin film coil 10 and to cover the periphery of the thin film coil 10. The insulating layer 11 is configured of, for example, a nonmagnetic insulating material such as a photoresist (photopolymer) that exhibits flowability when heated.

In the present embodiment, the insulating layer 11 covers only lateral sides of the thin film coil 10 as illustrated in FIG. 2B, and does not cover the upper portions thereof. The insulating layer 12 is formed so as to cover the periphery of the insulating layer 11. The insulating layer 12 is configured of a nonmagnetic material such as, for example, alumina or the like. The insulating layer 13 is arranged so as to cover each of the insulating layers 11 and 12 as well as the thin film coil 10. The insulating layer 13 is configured of a nonmagnetic material such as, for example, alumina or the like. The nonmagnetic layer 14 is formed of a nonmagnetic insulating material such as, for example, alumina or the like, or a nonmagnetic conductive material such as, for example, ruthenium or the like.

The main magnetic pole layer 40 accommodates the magnetic flux for magnetic recording generated in the thin film coil 22, and emits the magnetic flux toward the recording medium to execute a recording process. Specifically, a magnetic field (a perpendicular magnetic field) is generated for magnetizing a recording medium in a direction orthogonal to its surface due to a magnetic flux for recording as a recording process of a perpendicular recording system.

The main magnetic pole layer 40 is arranged in a leading side of the thin film coil, and extends from the ABS 70 in rearward direction. Specifically, it extends to the back gap 50BG.

The "leading side" is, when a movement state of the recording medium that moves in a medium travel direction M illustrated in FIG. 2B is regarded as a flow, an inflow side, and is, herein, an upstream side in the thickness direction (z-direction). On the other hand, an outflow side is referred to as "a trailing side," and is a downstream side in the thickness direction (z-direction).

As illustrated in FIG. 2B, the main magnetic pole layer 40 of the embodiment of the present invention has a structure where the main magnetic pole 15 and a magnetic pole main layer 19 are layered in this order and are linked to each other. In other words, the structure is a lamination structure (a two layer structure) where the main magnetic pole 15 is arranged in the leading side and the magnetic pole main layer 19 is arranged in the trailing side.

The main magnetic pole 15 functions as an emission part of the magnetic flux for main writing. The main magnetic pole 15 extends from the ABS 70 in a rearward direction on the reading side, and extends to the back gap 50GB. The main magnetic pole 15 that is described above is configured of a magnetic material, which has a higher saturation magnetic flux density than a magnetic material configuring the magnetic pole main layer 19, and specifically is configured of an iron-based alloy or the like. The iron-based alloys to be used are, for example, an iron-nickel alloy (FeNi) that contains a significant amount of iron (Fe), an iron-cobalt alloy (FeCo), an iron-cobalt-nickel alloy (FeCoNi), or the like.

The main magnetic pole 15 is configured in a battledore-shape (Japanese battledore-shape) seen in the plan view as illustrated in FIG. 3. In the other words, the main magnetic pole 15 is configured with the tip part 15A and a rear tip part 15B disposed apart the ABS 70 in this order. The tip part 15A extends from the ABS 70 in the rearward direction and has a width W1 that defines a recording track width of the recording medium. The rear tip part 15B links to a rear of the tip part 15A and has a width W4 that is wider than the width W1 (W4>W1). A position where the width of the main magnetic pole 15 starts to widen from the tip part 15A (the width W1) to the rear tip part 15B (the width W4) is referred to as a "flare point (FP.)" The FP is one of the important factors that determine the recording performance of the thin film head.

The tip part 15A is a part mainly and substantially for emitting the magnetic flux for recording generated in the thin film coil 22 toward the recording medium. As illustrated in FIG. 3, the tip part 15A has an exposure surface that is exposed to the ABS 70.

As illustrated in FIG. 2A, the exposure surface of the tip part 15A has, for example, a trapezoidal shape where its width is gradually narrowed from the trailing side toward the leading side. A trailing edge of the tip part 15A is substantially a recording part.

The rear tip part 15B, which is illustrated in FIG. 3, is a part for accommodating the magnetic flux that is accommodated by the magnetic pole main layer 19 and for supplying it to the tip part 15A. The width of the rear tip part 15B is constant (the width W4) at the rearward side, and is gradually narrowed from the width W4 to the width W1 as it nears the tip part 15A at the forward side.

The magnetic pole main layer 19 functions as an accommodation part for a main magnetic flux. The magnetic pole main layer 19, for example, extends from a position P1 (FIG. 3) that is a stepped back position from the ABS 70 toward the rearward side. The magnetic pole main layer 19 is configured of, for example, a magnetic material having a lower saturation magnetic flux density than the magnetic material configuring the main magnetic pole 15. A preferred example is an iron-cobalt-nickel alloy.

The magnetic pole main layer 19 has, for example, a rectangular plan shape having the width W4 as illustrated in FIG. 3.

The insulating layer 16 electrically separates the main magnetic pole 15 from the periphery, and is configured of a nonmagnetic insulating material such as, for example, alumina or the like.

The write shield layer 60 receives a spreading component of the magnetic flux for recording that is emitted from the tip part 15A of the main magnetic pole layer 40, and functions to suppress the spread of the magnetic flux.

The write shield layer 60 is arranged on the trailing side of the main magnetic pole layer 40 and the thin film coil 22. Since the write shield layer 60 extends from the ABS 70 toward the rearward side, the write shield layer 60 is separated from the magnetic pole layer 20 by the gap film 17 at the near side of the ABS 70, and is linked to the magnetic layer 40 through the back gap 50BG at the far side.

The write shield layer 60 of the present embodiment includes a TH defining layer 18 and the yolk layer 23. The TH defining layer 18 and the yolk layer 23 are structured in a linkage manner relative to each other.

Additionally, the write shield layer 60 can also be integrated without limitation to a linkage structure as illustrated in the drawings.

The TH defining layer 18 functions as an intake gate of a main magnetic flux for receiving an extra magnetic flux out of the magnetic flux that is directly emitted from the magnetic pole.

The TH defining layer 18 is configured of a magnetic material having a high saturation magnetic flux density such as, for example, Permalloy, iron-based alloy, or the like. The TH defining layer 18 has a rectangular plan shape whose width W5 is wider than the width W4 of the main magnetic pole layer 40 as illustrated in FIG. 3 (W5>W4).

The TH defining layer 18 is adjacent to an auxiliary insulating layer 20 at a back area. The TH defining layer 18 defines a front most position of the auxiliary insulating layer 20, so that it substantially functions to define the throat height.

The yolk layer 23 is configured so as to function as a flow path for the magnetic flux taken in from the TH defining layer 18. Furthermore, the yolk layer 23 is also configured to function as a return yolk where the magnetic flux returns from the so-called under layer of the magnetic recording medium. The yolk layer 23 extends to the back gap 50BG from the ABS 70 via the insulating layer 50 as lying over the TH defining layer 18 as illustrated in FIG. 2B. In other words, the yolk layer 23 links in a manner of lying over the TH defining layer 18 in the forward part, and, links in a manner of being adjacent to the main magnetic pole layer 40 via the back gap 50BG. In the backward part.

The yolk layer 23 is configured of, for example, a magnetic material that is the same as the magnetic material that configures the TH defining layer 18. The yolk layer 23 also has a rectangular plan shape whose width is W5 as illustrated in FIG. 3.

As described above, the microwave oscillation element 300 is arranged at a position between the first magnetic pole (the tip part 15A of the main magnetic pole 15) that generates a writing magnetic field for writing on the magnetic recording medium and a second magnetic pole (the TH defining layer 18 of the write shield layer 60), that reaches the medium opposing surface. For example, a structure in which current for the spin wave excitation is applied from the second magnetic pole to the first magnetic pole is obtained when the oscillating layer 330 that configures the microwave oscillation element 300 is adjacent to the first magnetic pole (the tip part 15A of the main magnetic pole 15) and the reference layer 360 is adjacent to the second magnetic pole (the TH defining layer 18 of the write shield layer 60).

When arranging the microwave oscillation element 300, as illustrated in FIG. 1, the electrodes 371 and 372 may be arranged at both edge parts of the lamination main part 310. However, it is also an extremely efficient embodiment if two magnetic poles for configuring the writing head are substituted as the electrodes.

For example, when substituting the two magnetic poles as the electrodes, as illustrated in FIG. 2B, an electrically insulating layer 23' is arranged in a part of the yolk layer 23 of the write shield layer 60, and the yolk layer is divided. Due to the electrically insulating layer 23', the second magnetic pole part of the write shield layer 60 and the tip part 15A of the main magnetic pole layer 40 are magnetically joined, but electrically insulated. Therefore, both of the two magnetic poles that is divided by the electrically insulating layer 23' are used as the electrodes for configuring the microwave oscillation element 300, and current for the spin excitation can be applied to the microwave oscillation element 300. The electrically insulating layer 23' is desired to be formed of a magnetic material having an electrical insulation property such as ferromagnetic oxide (for example, ferrite).

As described above, due to application of the current for the spin wave excitation from the side of the reference layer 360 toward the side of the oscillating layer 330 as illustrated in FIG. 1, the magnetization information (spin) of the reference layer 360 is transferred to the oscillating layer 330 through the nonmagnetic intermediate layer 340, the excitation of the spin wave occurs, and the high frequency electromagnetic field is generated from the oscillating layer 330. The generated high frequency electromagnetic field has a component of layer in-plane direction of a perpendicular magnetized layer at a position of a perpendicular magnetized layer of the magnetic recording medium (a magnetic disk). A part of the anisotropic magnetic field Hk that is irradiated can be decreased by irradiating such a high frequency electromagnetic field to a part of the perpendicular magnetized layer. The anisotropic magnetic field Hk is a physical quantity to give a coercive force Hc. The writing magnetic field is applied from the tip part 15A of the main magnetic pole 15 to a part where the anisotropic magnetic field Hk is decreased. Then, this makes it possible to write on the perpendicular magnetized layer having the extremely large anisotropic magnetic field Hk, and an excellent microwave assisted magnetic recording is provided. Additionally, it is desired that a frequency of the high frequency electromagnetic field generated from the oscillating layer 330 configuring the microwave oscillation element is substantially the same as a magnetic resonance frequency of the magnetic recording layer of the magnetic recording medium that is a writing object.

Additionally, it is preferred that a width WS is narrower than the width W1, as illustrated in FIGS. 2A and 3. The width WS is a width in the track width direction at the edge on the side of the medium opposing surface of the microwave oscillation element 300. The width W1 is the width in the track width direction at the edge on the side of the medium opposing surface of the first magnetic pole that generates the writing magnetic field. As a result, microwave assisted magnetic recording, in which a microwave is dominant, becomes possible.

The gap layer 17 is formed so as to magnetically separate the main magnetic pole layer 40 and the write shield layer 60, and is formed in a manner of surrounding the microwave oscillation element 300 on both sides in the track width direction (x-direction) and the rearward direction (y-direction). The gap layer 17 is formed of a nonmagnetic insulating material such as, for example, alumina, silicon dioxide, aluminum nitride or the like. The thickness is set in approximately 0.01-0.1 μm.

The insulating layer 50 defines the throat height, which is one of the important factors for determining the recording characteristics of the thin film magnetic head, and is formed so as to be electrically separated from the periphery by covering the thin film coil 22. The insulating layer 50, as illustrated in FIG. 2B, has a structure where the auxiliary insulating layer 20 and the main insulating layer 21 are layered in this order. The auxiliary insulating layer 20 is formed so as to substantially define the throat height and the main insulating layer 21 is formed so as to substantially cover the thin film coil 22.

The main insulating layer 21 steps back more than the auxiliary insulating layer 20. The main insulating layer 21 is configured including a main insulating layer part 21A and a main insulating layer part 21B as illustrated in FIG. 2B. The main insulating layer part 21A is arranged as a base of the thin film coil 22. The main insulating layer part 21B is arranged so as to cover the thin film coil 22 and the main insulating layer part 21A that is disposed in the periphery of the thin film coil 22. The main insulating layer part 21A is configured of a nonmagnetic material such as, for example, alumina, and the main insulating layer part 21B is configured of a nonmagnetic insulating material such as, for example, a photoresist, a spin-on glass, or the like, which exhibits a flowability when heat is applied.

The thin film coil 22 is formed to generate a magnetic flux for recording. The thin film coil 22 is, for example, operated to flow current in an opposite direction from the direction where the current flows in the above-described thin film coil 10.

Additionally, the entire structure of the above-described thin film magnetic head is not limited to the above structure, and can be modified in various ways.

Such a thin film magnetic head is manufactured with conventional thin film processes with sequential forming and layering of each layer. The conventional thin film processes include a film forming technique such as a plating process and sputtering, a patterning technique such as photolithography, and an etching technique such as a dry etching and wet etching.

[Descriptions Regarding a Head Gimbal Assembly and a Hard Disk Device]

Next, the description of an example will be given regarding a head gimbal assembly that is used in a manner where the thin film head is mounted, and the hard disk device.

Initially, the description will be given regarding a slider 210 that is included in the head gimbal assembly referring to FIG. 4. In the hard disk device, the slider 210 is arranged so as to oppose a hard disk, which is a recording medium having a disk shape and is rotatably driven. The slider 210 provides a base substrate 211 that is mainly configured with a substrate and an overcoat.

The base substrate 211 has a substantially hexahedral shape. One surface of the six outer surfaces of the base substrate 211 is arranged to oppose the hard disk. The medium opposing surface 70 is formed on the one surface.

Figure 4:
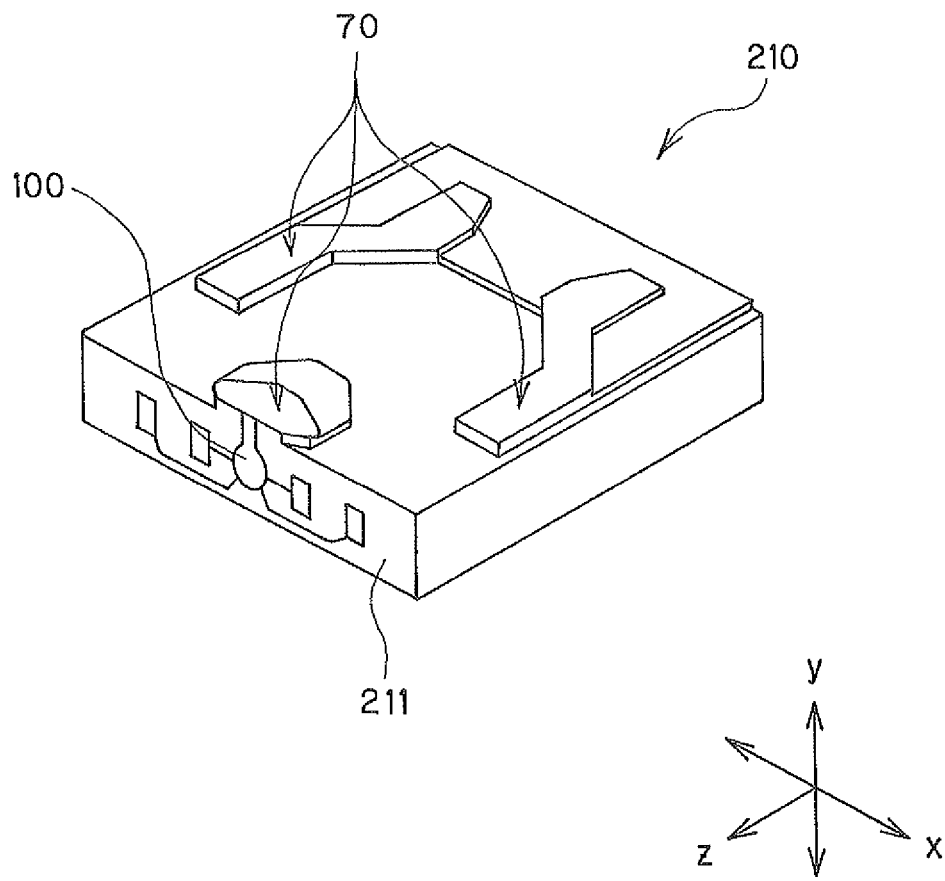
FIG. 4 is a perspective view illustrating a slider incorporated in a head gimbal assembly of one embodiment of the present invention.

When the hard disk rotates in the z-direction of FIG. 4, air flow passing between the hard disk and the slider 210 generates a lifting force in a lower part of the y-direction of FIG. 4 to the slider 210. The slider 210 flies from the surface of the hard disk due to the lifting force. Additionally, the x-direction of FIG. 4 indicates a track crossing direction of the hard disk.

In the vicinity of the edge part of the side of the airflow of the slider 210 (the edge part of the left-bottom of FIG. 4), the thin film magnetic head according to the present embodiment is formed.

Next, a description will be given regarding a head gimbal assembly 220 according to the present embodiment with reference to FIG. 5. A head gimbal assembly 220 has the slider 210 and a suspension 221 elastically supporting the slider 210. The suspension 221 has a load beam 222, a flexure 223, and a base plate 224. The load beam 222 is formed in a plate (leaf) spring shape and made of, for example, stainless steel. The flexure 223 is arranged in one edge part of the load beam 222 and joined to the slider 210 to give the slider 210 suitable flexibility. The base plate 224 is arranged in the other edge part of the load beam 222.

The base plate 224 is mounted on an arm 252 of an actuator for moving the slider 210 in the track crossing direction x of the hard disk 262. The actuator has an arm 252, and a voice coil motor for driving the arm 252. At the part of the flexure 223 to which the slider 210 is attached, a gimbal part is disposed to maintain the slider 210 in an appropriate position and orientation.

The head gimbal assembly 220 is mounted on the arm 252 of the actuator. A part in which the head gimbal assembly 220 is mounted on one arm 252 is referred to as a head arm assembly. A part in which the head gimbal assembly 220 is mounted on each arm of a carriage having a plurality of arms is referred to as a head stack assembly.

Figure 5:
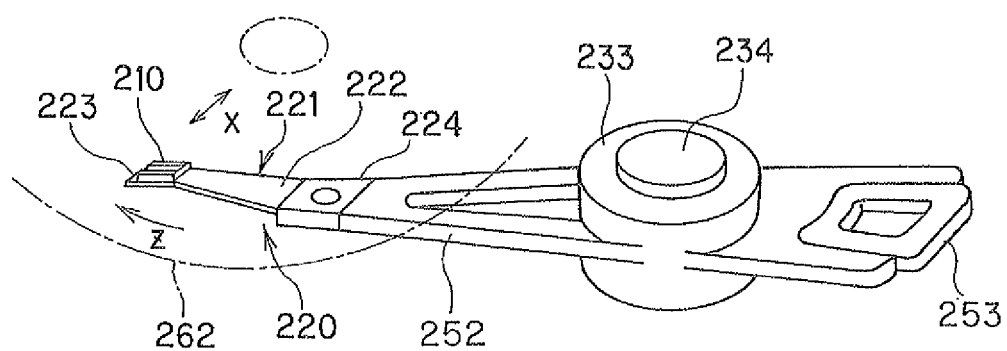
FIG. 5 is a perspective view illustrating a head arm assembly incorporating a head gimbal assembly of one embodiment of the present invention.

FIG. 5 illustrates one example of the head arm assembly. In this head arm assembly, the head gimbal assembly 220 is mounted on one edge of the arm 252. On the other edge of the arm 252, a coil 253 is mounted, which forms one part of a voice coil motor. In the middle section of the arm 252, a bearing part 233 is arranged, which is mounted on the shaft 234 for rotatably supporting the arm 252.

A description will be given regarding one example of the head stack assembly and a hard disk device according to the present embodiment with reference to FIGS. 6 and 7.

Figure 6:
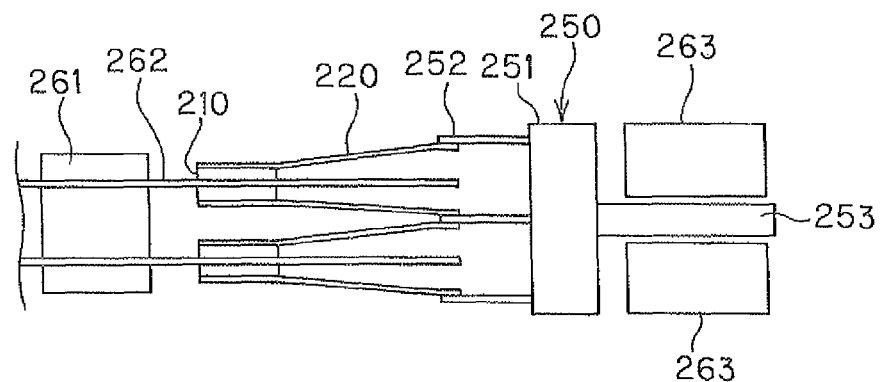
FIG. 6 is an explanatory view illustrating a main part of a magnetic disk device of one embodiment of the present invention.
Figure 7:
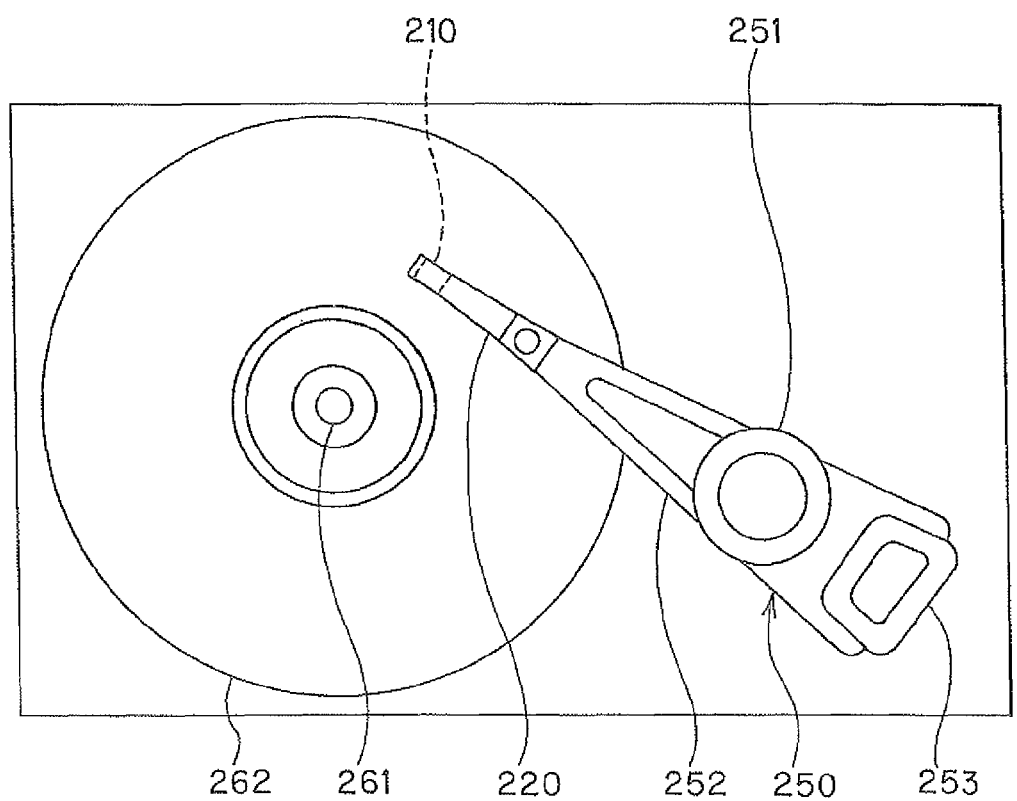
FIG. 7 is a plan view of the magnetic disk device of one embodiment of the present invention.

FIG. 6 is an explanation drawing that illustrates a main part of the hard disk device. FIG. 7 is a plan view of the hard disk device.

The head stack assembly 250 includes a carriage 251 having a plurality of arms 252. On the plurality of arms 252, a plurality of head gimbal assemblies 220 are mounted so as to align at an interval to each other in the vertical direction. At the carriage 251 in the opposite side of arm 252, the coil 253 is mounted to be a part of the voice coil motor. The head stack assembly 250 is incorporated in the hard disk device.

The hard disk device includes a plurality of hard disks 262 that is mounted to a spindle motor 261. On each hard disk 262, two sliders 210 are arranged so as face each other on both sides of the hard disk 262. The voice coil motor has permanent magnets 263 that are positioned facing each other on both sides of the coil 253.

An actuator and the head stack assembly 250 except the slider 210 corresponds to a positioning device of the present invention, supporting the slider 210 and positioning the slider 210 with respect to the hard disk 262.

In the hard disk device according to the present embodiment, the actuator moves the slider 210 in the track crossing direction of the hard disk 262 and positions the slider 210 with respect to the hard disk 262. The thin film magnetic head included in the slider 210 records information on the hard disk 262 by the recording head, and reproduces information recorded on the hard disk 262 by the reproducing head.

The head gimbal assembly and the hard disk device according to the present embodiment have an effect that is similar to the thin film magnetic head according to the present embodiment, which is described above.

[Functions of the Microwave Oscillation Element with Respect to the Magnetic Head]

When current is applied in a direction perpendicular to a lamination surface of the lamination main part 310 of the microwave oscillation element 300, an electron spin of the reference layer 360 is transferred by the current, and thereby a spin torque is generated. A magnetization of the oscillating layer 330 starts a precession due to the spin torque. A spin wave is excited due to the precession of the magnetization of the oscillating layer 330. A high frequency electromagnetic field of a microwave area leaks from the oscillating layer 330 in which the spin wave is excited. A magnetization of the magnetic recording layer of the magnetic recording medium where the leaked electromagnetic wave is given, receives a fluctuation. As a result, it enables magnetization reversal of the magnetic recording layer, which used to be impossible only with a writing magnetic field from a conventional main magnetic pole. Thereby, this becomes possible to realize an excellent microwave assisted magnetic recording. For example, this contributes to achieve a recording density over 1 Tbits/in$^2$.

EXAMPLES

Further detailed description will be given regarding the above-described invention of the microwave oscillation element with concrete examples, which will be described below.

Experimental Example I

Example 1

A microwave oscillation element structured with a lamination structure illustrated in Table 1, which is described below, was formed by a sputtering method, and was used as a sample of example 1 of the present invention.

An experiment to verify an efficiency of spin injection was executed. In the present experiment, materials of both reference layers 360 of the present invention and comparative examples, which will be described later, were limited to $Co_{70}Fe_{30}$. This reference layer 360 was combined with the other lamination configuration, and a microwave oscillation element that was substantially a GMR element was formed. GMR ratio of the formed element was measured. An improvement in the efficiency of the spin injection was verified based on the measured value of the GMR ratio. Additionally, increase in the GMR ratio means the improvement of the efficiency of the spin injection of the element configuration.

In the lamination structure of the microwave oscillation element of the sample of the example 1, as illustrated in Table 1, an oscillating layer 330 made of $Co_{80}Ir_{20}$ having a thickness of 10 nm was formed, a nonmagnetic intermediate layer 340 made of Ru having a thickness of 3 nm was formed thereon, a polarizer layer 350 made of $Co_{92.5}Cr_{7.5}$ having a thickness of 3 nm was formed thereon, and a reference layer 360 made of $Co_{70}Fe_{30}$ having a thickness of 4 nm was formed thereon (completed lamination main part 310).

The reference layer 360 made of $Co_{70}Fe_{30}$ was used to experimentally verify whether or not the efficiency of the spin injection was improved.

All of the oscillating layer 330 made of $Co_{80}Ir_{20}$, the nonmagnetic intermediate layer 340 made of Ru, and the polarizer layer 350 made of $Co_{92.5}Cr_{7.5}$ were configured of a material having hexagonal system. Moreover, distances between crystal lattices were almost the same, providing an advantage of a crystal orientation during lamination.

Electrodes 371 and 372 made of Au having the thickness of 200 nm were formed at both edge parts in the lamination direction of the lamination main part 310.

TABLE 1

(Example 1)

| Lamination Structure | Configuration Material of Layer | Thickness (nm) |
|---|---|---|
| Electrode (371) | Au | 200 |
| Reference Layer (360) | $Co_{70}Fe_{30}$ | 4 |
| Polarizer Layer (350) | $Co_{92.5}Cr_{7.5}$ | 3 |
| Nonmagnetic Intermediate Layer (340) | Ru | 3 |
| Oscillating Layer (330) | $Co_{80}Ir_{20}$ | 10 |
| Electrode (372) | Au | 200 |

Example 2

A material of the nonmagnetic intermediate layer was changed to Cr from example 1, which was described above. A sample of example 2 of the present invention, as illustrated in the following Table 2, was manufactured the same as example 1 except for the material of the intermediate layer.

TABLE 2

(Example 2)

| Lamination Structure | Configuration Material of Layer | Thickness (nm) |
|---|---|---|
| Electrode (371) | Au | 200 |
| Reference Layer (360) | $Co_{70}Fe_{30}$ | 4 |
| Polarizer Layer (350) | $Co_{92.5}Cr_{7.5}$ | 3 |
| Nonmagnetic Intermediate Layer (340) | Cr | 3 |
| Oscillating Layer (330) | $Co_{80}Ir_{20}$ | 10 |
| Electrode (372) | Au | 200 |

Example 3

A material of the polarizer layer 350 was changed to $Co_{92.5}Ru_{7.5}$ from example 1, which was described above. A sample of example 3 of the present invention, as illustrated in the following Table 3, was manufactured the same as example 1 except for the material of the polarizer layer 350.

TABLE 3

(Example 3)

| Lamination Structure | Configuration Material of Layer | Thickness (nm) |
|---|---|---|
| Electrode (371) | Au | 200 |
| Reference Layer (360) | $Co_{70}Fe_{30}$ | 4 |
| Polarizer Layer (350) | $Co_{92.5}Ru_{7.5}$ | 3 |
| Nonmagnetic Intermediate Layer (340) | Ru | 3 |
| Oscillating Layer (330) | $Co_{80}Ir_{20}$ | 10 |
| Electrode (372) | Au | 200 |

Example 4

A material of the nonmagnetic intermediate layer was changed to Cr from example 3, which was described above. A sample of example 4 of the present invention, as illustrated in following Table 4, was manufactured the same as example 3 except for the material of the nonmagnetic intermediate layer.

TABLE 4

(Example 4)

| Lamination Structure | Configuration Material of Layer | Thickness (nm) |
|---|---|---|
| Electrode (371) | Au | 200 |
| Reference Layer (360) | $Co_{70}Fe_{30}$ | 4 |
| Polarizer Layer (350) | $Co_{92.5}Ru_{7.5}$ | 3 |
| Nonmagnetic Intermediate Layer (340) | Cr | 3 |
| Oscillating Layer (330) | $Co_{80}Ir_{20}$ | 10 |
| Electrode (372) | Au | 200 |

Comparison Example 1

A microwave oscillation element configured with a lamination structure illustrated in Table 5 was formed by a sputtering method, and it was used as a sample of comparative example 1. An experiment to verify an efficiency of spin injection was executed. In the present experiment, reference layers 360 of the comparative examples, which were described above, were limited to $Co_{70}Fe_{30}$. This reference layer 360 was combined with the other lamination configuration, and a microwave oscillation element that was substantially a GMR element was formed. A GMR ratio of the formed element was measured. An improvement in the efficiency of the spin injection was verified based on the size of the measured value of the GMR ratio.

In the lamination structure of the microwave oscillation element in the sample of comparative example 1, as illustrated in Table 1, an oscillating layer 330 made of $Co_{96}Ir_4$ having a thickness of 10 nm was formed, a nonmagnetic intermediate layer 340 made of Cu having a thickness of 3 nm was formed thereon, and a reference layer 360 made of $Co_{70}Fe_{30}$ having a thickness of 4 nm was formed thereon (completed lamination main part 310).

An intervening polarizer layer 350 was not in comparative example 1. Moreover, both the γ value of an interface between the nonmagnetic intermediate layer 340 made of Cu and the oscillating layer 330 and the γ value of an interface between the nonmagnetic intermediate layer 340 made of Cu and the reference layer 360 were positive (γ>0).

The reference layer 360 was used to experimentally verify whether or not the efficiency of the spin injection was improved.

TABLE 5

(Comparative Example 1)

| Lamination Structure | Configuration Material of Layer | Thickness (nm) |
|---|---|---|
| Electrode (371) | Au | 200 |
| Reference Layer (360) | $Co_{70}Fe_{30}$ | 4 |
| Nonmagnetic Intermediate Layer (340) | Cu | 3 |
| Oscillating Layer (330) | $Co_{96}Ir_4$ | 10 |
| Electrode (372) | Au | 200 |

Comparison Example 2

A polarizer layer 350 was omitted from example 1. A sample of comparative example 2, as illustrated in the following Table 6, was manufactured the same as example 1 except for omitting the polarizer layer 350.

TABLE 6

(Comparative Example 2)

| Lamination Structure | Configuration Material of Layer | Thickness (nm) |
|---|---|---|
| Electrode (371) | Au | 200 |
| Reference Layer (360) | $Co_{70}Fe_{30}$ | 4 |
| Nonmagnetic Intermediate Layer (340) | Ru | 3 |
| Oscillating Layer (330) | $Co_{80}Ir_{20}$ | 10 |
| Electrode (372) | Au | 200 |

The GMR change ratio of the samples of examples 1-4 and comparative examples 1-2 were obtained with the following procedure.

(1) GMR Change Ratio

MR change ratio was measured by a conventional direct current (DC) four terminal method. The GMR change ratio is a value that a change amount of resistance $\Delta R$ is divided by a resistance value R, and is indicated as $\Delta R/R$. The number of sample was 100 (n=100), and an average value of these was obtained.

The GMR change ratio was indicated with a relative value with respect to how much the value of the change ratio of the other sample including the samples of example 1-4 of the present invention became when the value of the change ratio of the sample of the comparative example 1 was set as "1".

The results of these are shown in Table. 7.

TABLE 7

| | GMR Change Ratio (Relative Value) |
|---|---|
| Sample of Example 1 | 3.3 |
| Sample of Example 2 | 3.2 |
| Sample of Example 3 | 2.9 |
| Sample of Example 4 | 2.6 |
| Sample of Comparative Example 1 | 1.0 |
| Sample of Comparative Example 2 | 0.8 |

According to the results of the experiment illustrated in Table 7, the effect of the present invention is obvious. In other words, in the sample of the present invention, an improvement ratio of the GMR ratio is significant, and it is understood that an efficiency of the spin injection is drastically improved. Thereby, the oscillation efficiency of the microwave oscillation element is greatly improved.

Experimental Example II

Example 5

A microwave oscillation element configured with a lamination structure illustrated in Table 8, was formed by a sputtering method, and it was used as a sample of example 5 of the present invention.

In the lamination structure of the microwave oscillation element in the sample of example 5, as illustrated in Table 8, an oscillating layer 330 made of $Co_{80}Ir_{20}$ having the thickness of 8 nm was formed, a nonmagnetic intermediate layer 340 made of Ru having the thickness of 3 nm was formed thereon, the polarizer layer 350 made of $Co_{92.5}Cr_{7.5}$ having the thickness of 2 nm was formed thereon, and a reference layer 360 made of $Co_{80}Pt_{20}$ having the thickness of 10 nm was formed thereon (completed lamination main part 310). The magnetization direction of $Co_{80}Pt_{20}$ was perpendicular direction with respect to an in-plane.

With respective to the oscillating layer 330 made of $Co_{80}Ir_{20}$, the nonmagnetic intermediate layer 340 made of Ru, the polarizer layer 350 made of $Co_{92.5}Cr_{7.5}$, and the reference layer 360 made of $Co_{80}Pt_{20}$, all of these were formed of the hexagonal material, had almost the same distance between crystal lattices, and had an advantage of a crystal orientation when laminated.

Electrodes 371 and 372 made of Au having the thickness of 50 nm were formed at both edge parts in the lamination direction of the lamination main part 310.

TABLE 8

(Example 5)

| Lamination Structure | Configuration Material of Layer | Thickness (nm) |
|---|---|---|
| Electrode (371) | Au | 50 |
| Reference Layer (360) | $Co_{80}Pt_{20}$ | 10 |
| Polarizer Layer (350) | $Co_{92.5}Cr_{7.5}$ | 2 |
| Nonmagnetic Intermediate Layer (340) | Ru | 3 |
| Oscillating Layer (330) | $Co_{80}Ir_{20}$ | 8 |
| Electrode (372) | Au | 50 |

To the microwave oscillation element manufactured as described above, a spin wave excitation current where the current density was $1 \times 10^{12}$ $A/m^2$ ($1 \times 10^8$ $A/cm^2$) was applied from the side of the electrode 371 to the side of the electrode 372. An electromagnetic field sensor was arranged in the vicinity of the oscillating layer of the microwave oscillation element and the output of the sensor was analyzed with a spectrum analyzer. The oscillation of the microwave having approximately 10 GHz was obtained.

According to the results of the experiments described above, the effect of the present invention is obvious.

In other words, the microwave oscillation element of the present invention includes the lamination main part where the oscillating layer, the nonmagnetic intermediate layer, the polarizer layer, and the reference layer are layered in this order. The oscillating layer is a magnetization free layer and generates a high frequency electromagnetic field by an excitation of the spin wave. The reference layer is to be a base magnetic layer of a spin transfer due to application of the current. The oscillating layer is made of CoIr, the polarizer layer is configured of CoCr or CoRu, and the nonmagnetic intermediate layer is configured of Cr or Ru. As a result, the efficiency of the spin injection is improved and the microwave oscillation element where the oscillation efficiency is excellent can be realized.

What is claimed is:
1. A microwave oscillation element, comprising:
a lamination main part in which an oscillating layer that is a magnetization free layer and that generates a high frequency electromagnetic field by an excitation of a spin wave, a nonmagnetic intermediate layer, a polarizer layer, and a reference layer that is to be a base magnetic layer of a spin transfer due to application of current are layered in this order, wherein
the oscillating layer is made of CoIr;
the polarizer layer is configured of CoCr or CoRu; and
the nonmagnetic intermediate layer is configured of Cr or Ru.

2. The microwave oscillation element according to claim 1, wherein
the polarizer layer and the reference layer are respectively magnetized in a perpendicular direction to an in-plane; and
the oscillating layer has an easy magnetization axis in a horizontal direction to an in-plane.

3. The microwave oscillation element according to claim 1, wherein
each layer of the lamination main parts in which the oscillating layer, the nonmagnetic intermediate layer, the polarizer layer, and the reference layer are layered in this order, is configured of a material having a hexagonal system.

4. The microwave oscillation element according to claim 3, wherein
the oscillating layer is made of CoIr;
the nonmagnetic intermediate layer is made of Ru;
the polarizer layer is made of CoCr; and
the reference layer is made of CoPt.

5. The microwave oscillation element according to claim 1, wherein
the oscillating layer is made of CoIr;
the nonmagnetic intermediate layer is made of Cr;
the polarizer layer is made of CoCr; and
the reference layer is made of CoPt.

6. The microwave oscillation element according to claim 1, wherein
the oscillating layer is made of CoIr;
the nonmagnetic intermediate layer is made of Ru;
the polarizer layer is made of CoRu; and
the reference layer is made of CoPt.

7. The microwave oscillation element according to claim 1, wherein
the oscillating layer is made of CoIr;
the nonmagnetic intermediate layer is made of Cr;
the polarizer layer is made of CoRu; and
the reference layer is made of CoPt.

8. The microwave oscillation element according to claim 1, wherein
the reference layer is configured with CoPt, FePt, a multilayer film of Co/Pd or a multilayer film of Co/Pt.

9. The microwave oscillation element according to claim 1, wherein
a Cr content of CoCr that configures the polarizer layer is 5-15 at %.

10. The microwave oscillation element according to claim 1, wherein
a Ru content of CoRu that configures the polarizer layer is 4-11 at %.

11. The microwave oscillation element according to claim 1, wherein
an Ir content of the oscillating layer made of the CoIr is 2-26 at %.

12. The microwave oscillation element according to claim 1, wherein
electrodes are formed at both edge parts in a lamination direction of the lamination main part;
due to applying current for a spin wave excitation from a side of the reference layer to a side of the oscillating layer, magnetization information of the reference layer is transferred to the oscillating layer through the nonmagnetic intermediate layer;
an excitation of a spin wave occurs; and
a high frequency electromagnetic field is generated from the oscillating layer.

13. A thin film magnetic head, comprising:
a first magnetic pole and a second magnetic pole for generating a writing magnetic field for writing on a magnetic recording medium; and
the microwave oscillation element according to claim 1 provided at a position that is between the first magnetic pole and the second magnetic pole, and that is on a medium opposing surface.

14. The thin film magnetic head according to claim 13, wherein
the oscillating layer that configures the microwave oscillation element is adjacent to the first magnetic pole;
the reference layer that configures the microwave oscillation element is adjacent to the second magnetic pole;
the thin film magnetic head has a structure in which current for the spin wave excitation can be applied from the second magnetic pole to the first magnetic pole;
due to application of the current, magnetization information on a side of the reference layer is transferred to the oscillating layer through the nonmagnetic intermediate layer;
an excitation of the spin wave occurs; and
a high frequency electromagnetic field is generated from the oscillating layer.

15. The thin film magnetic head according to claim 13, wherein
a width in a track width direction at an edge of a medium opposing surface side of a microwave oscillation element is narrower than a width in a track width direction at a edge of a medium opposing surface side of the first magnetic pole for generating the writing magnetic field.

16. The thin film magnetic head according to claim 13, wherein
a frequency of a high frequency electromagnetic field generated from the oscillating layer that configures the microwave oscillation element is substantially equal to a magnetic resonant frequency of the magnetic recording layer of the magnetic recording medium that is a writing object.

17. A head gimbal assembly, comprising:
a slider including the thin film magnetic head according to claim 13 and positioned so as to oppose a recording medium; and
a suspension elastically supporting the slider.

18. A magnetic disk device, comprising:
a slider including the thin film magnetic head according to claim 13 and positioned so as to oppose a recording medium; and
a positioning device that support the slider and position with respect to the recording medium.

* * * * *